United States Patent
Damboiu et al.

(10) Patent No.: US 11,053,715 B2
(45) Date of Patent: Jul. 6, 2021

(54) SECURING HANDLE FOR AN OPENABLE SIDE WINDOW

(71) Applicant: Webasto SE, Stockdorf (DE)

(72) Inventors: Cristian Damboiu, Howell, MI (US); Nabeal Kakish, Northville, MI (US)

(73) Assignee: WEBASTO SE, Stockdorf (DE)

( * ) Notice: Subject to any disclaimer, the term of this patent is extended or adjusted under 35 U.S.C. 154(b) by 635 days.

(21) Appl. No.: 15/895,583

(22) Filed: Feb. 13, 2018

(65) Prior Publication Data
US 2019/0249473 A1 Aug. 15, 2019

(51) Int. Cl.
*E05C 3/04* (2006.01)
*E05C 3/14* (2006.01)
*B60J 1/08* (2006.01)

(52) U.S. Cl.
CPC ............... *E05C 3/145* (2013.01); *B60J 1/085* (2013.01); *E05Y 2900/55* (2013.01); *Y10T 292/108* (2015.04); *Y10T 292/1083* (2015.04); *Y10T 292/1089* (2015.04)

(58) Field of Classification Search
CPC .... Y10S 292/06; Y10S 292/20; Y10S 292/63; Y10T 292/108; Y10T 292/1083; Y10T 292/1084; Y10T 292/1089; Y10T 292/0969; Y10T 292/0994; Y10T 292/0997; Y10T 292/14; E05C 3/145; B60J 1/085
USPC .................. 49/449–451; 296/146.15, 146.16
See application file for complete search history.

(56) References Cited

U.S. PATENT DOCUMENTS

| | | | |
|---|---|---|---|
| 145,972 A * | 12/1873 | Shewell | E05F 11/00 292/207 |
| 196,662 A * | 10/1877 | Hammond | E05B 13/002 292/207 |
| 229,451 A * | 6/1880 | Nye | E05B 13/002 292/207 |
| 255,194 A * | 3/1882 | Robertson | E05B 85/22 292/173 |
| 275,018 A * | 4/1883 | Chandler | E05B 13/002 292/207 |
| 607,260 A * | 7/1898 | Morse | E05B 67/383 292/151 |
| 753,544 A * | 3/1904 | Cassidy | E06B 9/52 160/15 |
| 966,865 A * | 8/1910 | Schuyler | E05F 11/00 292/207 |
| 1,035,470 A * | 8/1912 | Roberts | E05F 11/00 292/207 |
| 1,171,775 A * | 2/1916 | Dowing | E05B 85/22 292/173 |

(Continued)

*Primary Examiner* — Carlos Lugo
(74) *Attorney, Agent, or Firm* — Fitch, Even, Tabin & Flannery, LLP (57) ABSTRACT

An openable side window for a motor vehicle is provided having an openable side window which covers a lateral vehicle opening when in its closed position and can be locked by a securing device, the securing device comprising a pivotable securing handle which can be pivoted between an unlocked position and a locked position and has an operating arm and a latch arm which, when in the locked position, interacts with a latch counterpart, wherein the latch arm comprises a functional element which is pre-loaded radially outward with respect to a pivot axis of the securing handle.

20 Claims, 8 Drawing Sheets

(56) References Cited

U.S. PATENT DOCUMENTS

| | | | | |
|---|---|---|---|---|
| 1,201,662 A * | 10/1916 | Weidenmuller | ........ | E05F 11/00 292/207 |
| 1,370,109 A * | 3/1921 | Hart | ........................ | E05C 3/041 292/239 |
| 1,386,671 A * | 8/1921 | Zych | ........................ | E05C 3/045 292/207 |
| 1,503,393 A * | 7/1924 | Twardowsky | .......... | E05C 3/043 292/241 |
| 1,604,977 A * | 11/1926 | Crone | ................... | F16B 21/125 411/342 |
| 1,656,159 A * | 1/1928 | Anderson | ............... | E05C 3/167 292/241 |
| 1,662,829 A * | 3/1928 | Legge | ..................... | B60J 10/74 292/173 |
| 1,945,156 A * | 1/1934 | Moore | ................... | E05B 83/243 292/202 |
| 2,202,393 A * | 5/1940 | Morrison | ................... | B60J 1/14 49/368 |
| 2,310,348 A * | 2/1943 | Blears | ..................... | E05C 3/043 292/202 |
| 2,484,514 A * | 10/1949 | Lane | ......................... | B60J 1/14 49/391 |
| 2,516,630 A * | 7/1950 | Hufnagel | ................ | E05F 11/00 292/163 |
| 2,603,515 A * | 7/1952 | Thomas | .................. | E05C 3/043 292/207 |
| 2,721,636 A * | 10/1955 | Ordorica | ................. | B60J 10/70 52/204.51 |
| 2,873,991 A * | 2/1959 | Larimore | ................ | E05C 3/041 292/241 |
| 3,053,555 A * | 9/1962 | Lahti | ......................... | B60J 1/14 411/368 |
| 3,171,678 A * | 3/1965 | Peras | ........................ | B60J 1/12 292/175 |
| 3,652,112 A * | 3/1972 | Panelli | .................... | E05C 3/043 292/210 |
| 3,827,184 A * | 8/1974 | Pennec | ............... | E05B 65/0864 49/449 |
| 4,525,952 A * | 7/1985 | Cunningham | ...... | E05B 15/0205 292/340 |
| 4,699,406 A * | 10/1987 | Swanson, Jr. | ....... | E05B 65/0864 292/175 |
| 4,840,414 A * | 6/1989 | Ford | ....................... | E05B 17/08 114/117 |
| 5,887,916 A * | 3/1999 | Finkelstein | ........... | F24C 15/022 292/202 |
| 6,450,361 B1 * | 9/2002 | Mendelson | .......... | A47J 27/0811 220/202 |
| 6,952,940 B2 * | 10/2005 | Molzer | ................. | E05B 1/0092 70/208 |
| 7,100,951 B2 * | 9/2006 | Jien | ....................... | E05B 13/002 292/207 |
| 8,419,085 B2 * | 4/2013 | Kim | ......................... | E05C 1/08 292/163 |
| 8,727,395 B2 * | 5/2014 | Nania | ..................... | E05C 17/62 292/165 |
| 8,967,681 B2 * | 3/2015 | Masumoto | .............. | E05C 3/145 292/202 |

\* cited by examiner

SECURING HANDLE FOR AN OPENABLE SIDE WINDOW

FIELD

A motor vehicle is provided having an openable side window, an openable side window of a motor vehicle, and a securing device for an openable side window.

BACKGROUND

From practice, all-terrain vehicles and what are known as sport-utility vehicles (SUVs) are known, which have a vehicle body that has four pillars on either side of a vertical longitudinal center plane of the vehicle, said pillars leading from a beltline to a roof side rail. A front door is disposed between a front pillar or A-pillar and a front center pillar or B-pillar. A rear side door is disposed between the B-pillar and a rear center pillar or C-pillar. A rear side window, also referred to as a quarter window, is disposed between the C-pillar and a rear-pillar or D-pillar. The quarter window may be openable or even removable from the vehicle body. In the closed position, in which the side window is connected to the vehicle, the quarter window is secured by means of a securing device.

SUMMARY

One embodiment described herein is a motor vehicle having an openable side window that is provided with a reliably working securing device for which a locked position and preferably an unlocked position are clearly defined. Moreover, another embodiment provides a side window having a securing device of this kind and to provide a securing device for an openable side window.

Herein a motor vehicle is proposed that has an openable side window which, when in its closed position, covers a lateral vehicle opening and can be locked by means of a securing device, the securing device comprising a pivotable securing handle which can be pivoted between an unlocked position and a locked position and has an operating arm and a latch arm which, when in the locked position, interacts with a latch counterpart, wherein the latch arm comprises a functional element which is pre-loaded radially outward with respect to a pivot axis of the securing handle.

By interacting with the latch counterpart, the functional element pre-loaded radially outward with respect to the pivot axis of the securing handle allows transferring the securing device into the locked position in such a manner that a user can clearly recognize that the locked position has been reached when displacing the securing handle. The functional element can enter and also engage into a seat in the latch counterpart.

In a preferred embodiment of the motor vehicle according to one approach, the functional element is a pin that is mounted to be movable. In particular, the pin, which can be made of steel, is accommodated in the latch arm of the securing handle.

In a preferred embodiment of the motor vehicle according to another approach, in order to ensure easy assembling of the securing handle, the pin can be mounted in a housing or sleeve which is accommodated in a body of the latch arm of the securing handle. In particular, the housing or sleeve, which can be a steel housing or sleeve, can be press-fitted into a recess in the latch arm.

The pin forming the functional element has a specific path of travel in the latch arm. The path of travel can be limited by an annular collar which serves as a stop defining at least an end position of the pin and interacting with a counterstop formed by the housing or sleeve, for example.

In a specific embodiment of the motor vehicle provided herein, the functional element is pre-loaded by means of a spring device which is accommodated in the latch arm or in the housing or sleeve in which the pin can shift. In particular, the spring device comprises a coil spring which supports the functional element. When the securing handle is being displaced from the unlocked position into the locked position, the functional element is pushed in the direction of the pivot axis of the securing handle against the action of the spring device. When the locked position has been reached, the functional element can then protrude again, i.e. move partly out of the latch arm and enter a recess of the latch counterpart, thereby making pivoting of the securing handle more difficult.

In order to ensure proper function of the securing device, the latch counterpart comprises a sliding plate which is in particular made of a steel sheet and has a sliding bottom on which the functional element of the latch arm slides when the securing handle is being pivoted into the locked position.

To define the locked position, a latch seat is preferably formed on the sliding bottom, the functional element being disposed in said latch seat when in the locked position.

In order to ensure that the securing handle can be pivoted into its locked position and out of its locked position, the sliding bottom preferably has two ramp sections which are inclined in opposite directions and which transition into each other and one of which limits the latch seat and transitions into it.

Furthermore, it is advantageous for the sliding plate to have a side wall on which a lateral contact surface of the latch arm of the securing handle slides when the securing handle is being pivoted into the locked position.

In a preferred embodiment, in order to even better define the locked position of the securing handle, the side wall has a seat section in which the contact surface of the latch arm of the securing handle is disposed when in the locked position.

The seat section is preferably limited by a ramp which facilitates displacing the securing handle.

In order to keep the operation forces during displacement of the securing handle low, the contact surface of the latch arm of the securing handle can have a ramp portion, too.

Additionally, the securing handle can have at least one stop which defines the locked position and/or the unlocked position of the securing handle and limits its maximum pivot angle.

Another specific embodiment of the securing handle can comprise an indexing element which, when in the locked position and/or in the unlocked position, engages into an indexing recess. For example, the indexing element is formed by a ball which can be spring-loaded.

In a specific embodiment of the motor vehicle according to the one approach, the securing handle is pivotably mounted on a frame of the side window and the latch counterpart is attached to the vehicle.

Alternatively, it is of course conceivable for the securing handle to be pivotably mounted on a vehicle body and for the latch counterpart to be disposed on a frame of the side window.

In the case of an all-terrain vehicle and when the side window is a quarter window, the latch counterpart is disposed on a roof side rail of the vehicle body, for example.

The side window can be provided with two securing handles configured according to one approach, each of which interacts with a vehicle-mounted latch counterpart.

The present embodiments also relate to an openable side window of a motor vehicle, having a securing device by means of which it can be locked in a closed position, in which a lateral vehicle opening is covered, the securing device comprising a pivotable securing handle which can be pivoted between an unlocked position and a locked position and has an operating arm and a latch arm which, when in the locked position, interacts with a latch counterpart, wherein the latch arm comprises a functional element which is pre-loaded radially outward with respect to a pivot axis of the securing handle.

Furthermore, the present embodiments relate to a securing device for an openable side window of a motor vehicle, having a securing handle which can be pivoted between an unlocked position and a locked position and has an operating arm and a latch arm which, when in the locked position, interacts with a latch counterpart, wherein the latch arm comprises a functional element which is pre-loaded radially outward with respect to a pivot axis of the securing handle.

BRIEF DESCRIPTION OF THE DRAWING

An embodiment example of a passenger vehicle having a quarter window configured according to the present embodiments is illustrated in a schematically simplified manner in the drawing and is explained in more detail in the following description.

DETAILED DESCRIPTION

Figure 1:
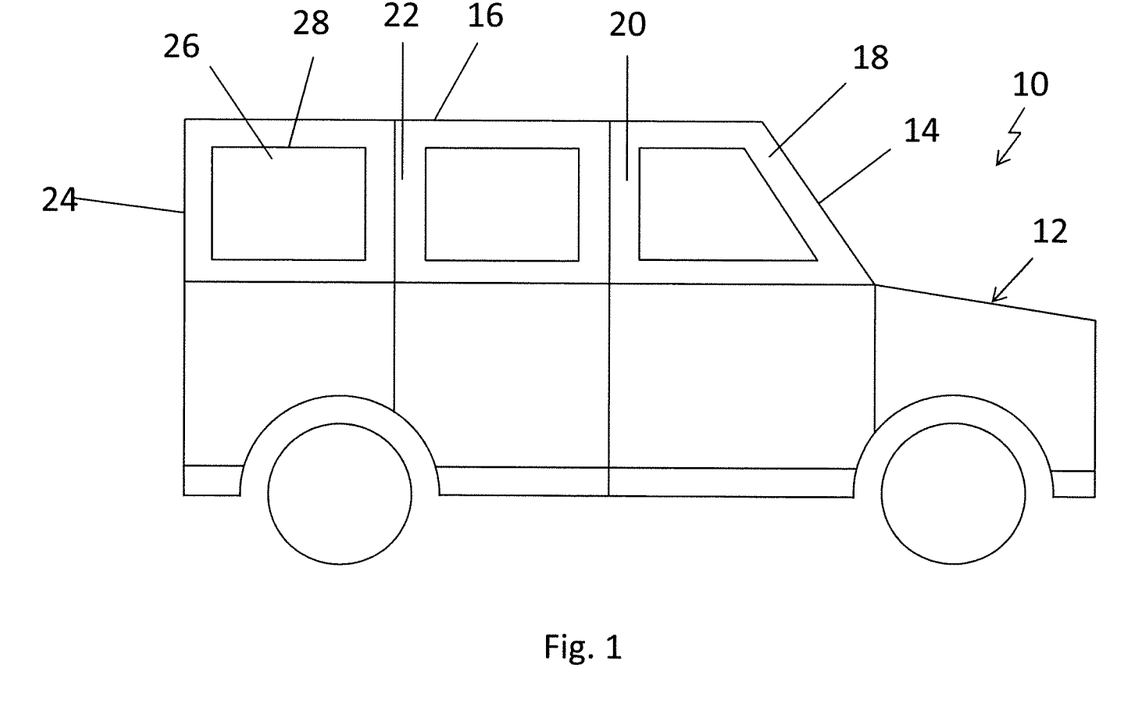
FIG. 1 shows a side view of a passenger vehicle, which is an all-terrain vehicle, comprising a quarter window.
Figure 2:
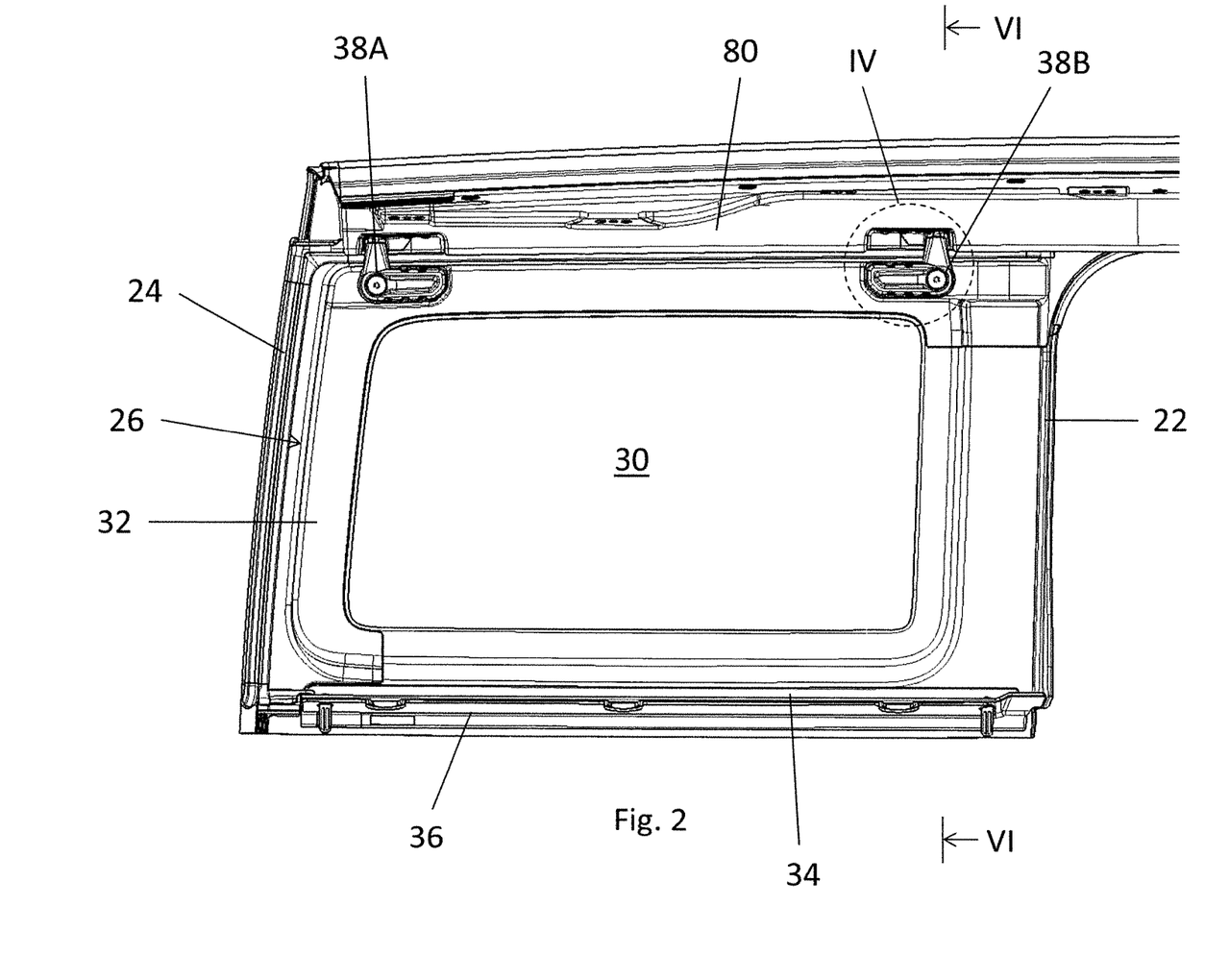
FIG. 2 shows an interior view of the quarter window of the passenger vehicle according to FIG. 1 with two securing handles in a locked position.
Figure 3:
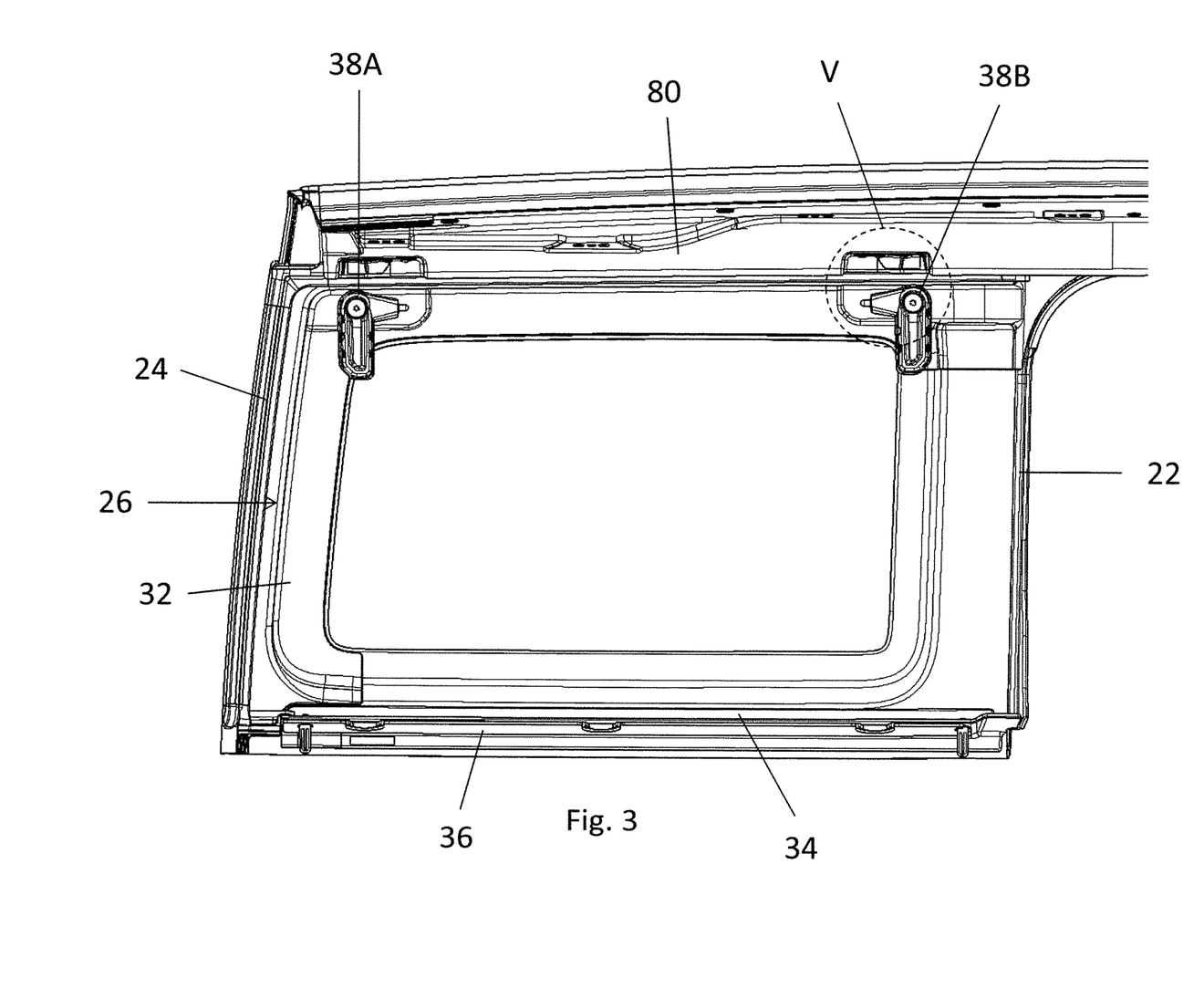
FIG. 3 shows a view of the quarter window corresponding to FIG. 2, but with the securing handles in an unlocked position.
Figure 4:
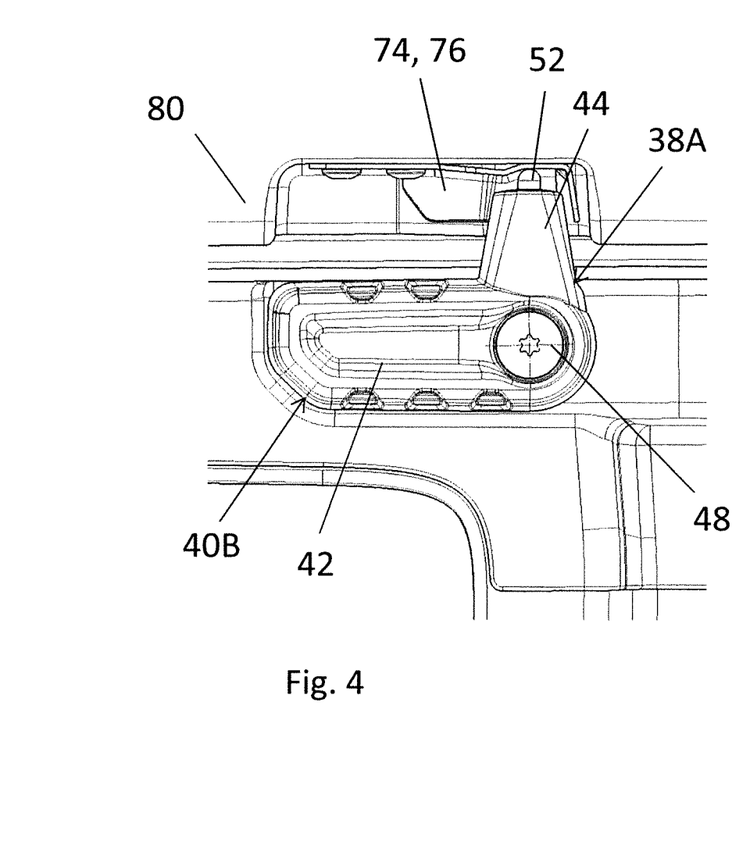
FIG. 4 shows an enlarged view of area IV in FIG. 2.
Figure 5:
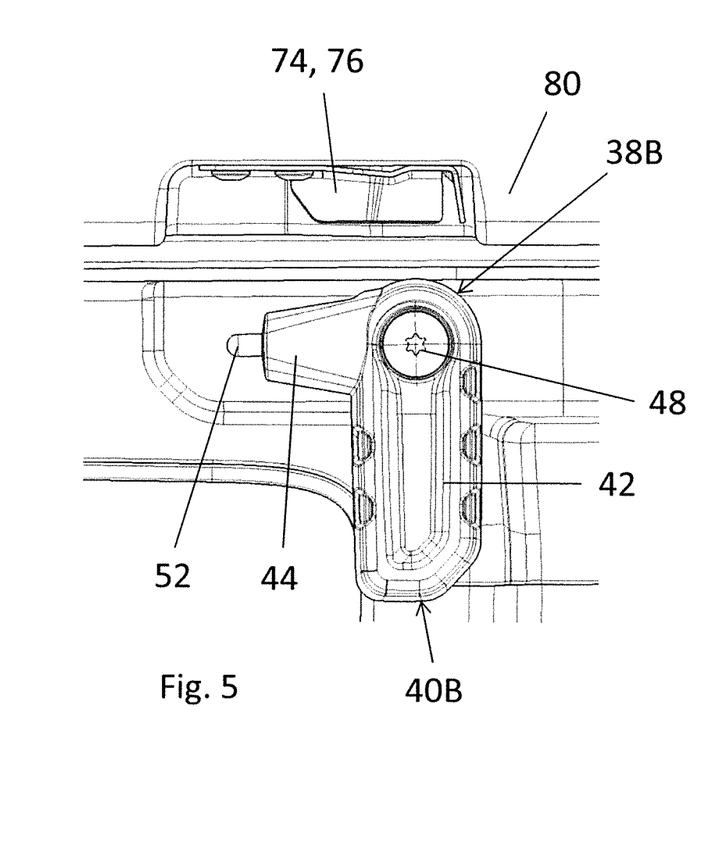
FIG. 5 shows an enlarged view of area V in FIG. 3.
Figure 6:
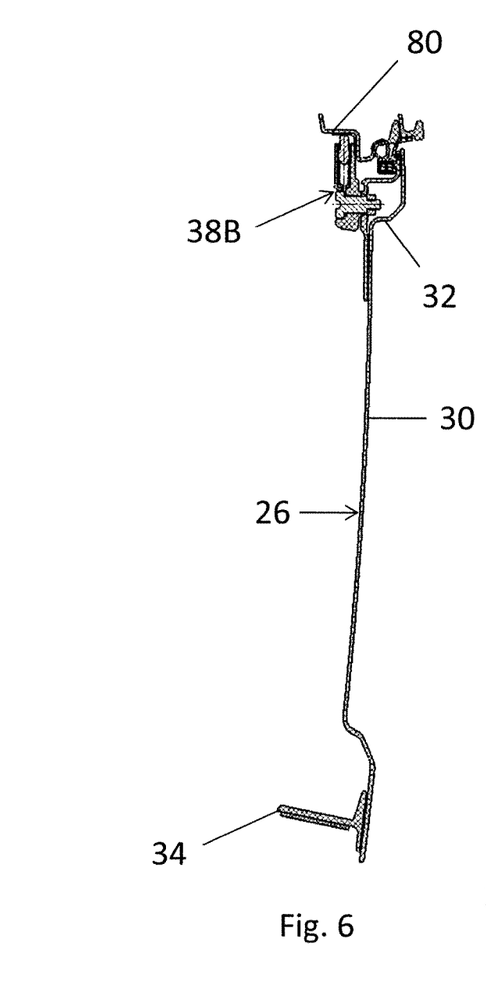
FIG. 6 shows a section through the quarter window along line VI-VI in FIG. 2.
Figure 7:
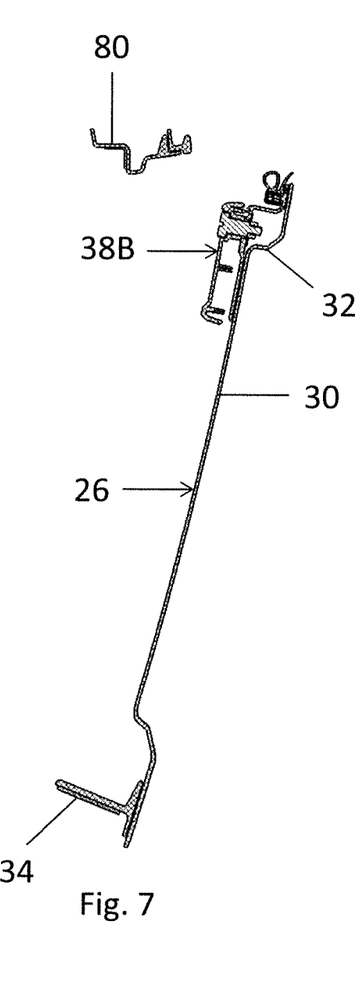
FIG. 7 shows a section through the quarter window corresponding to FIG. 6, but during its removal from a vehicle body.
Figure 8:
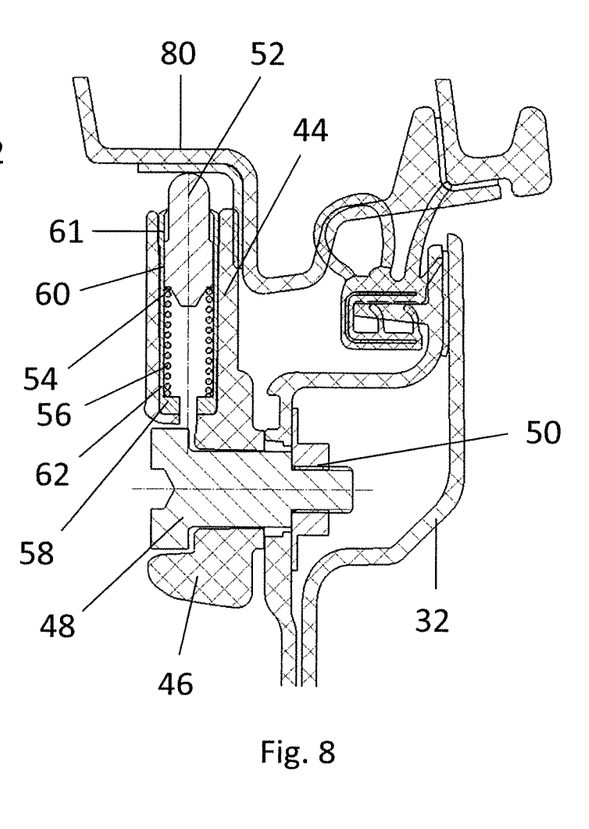
FIG. 8 shows an enlarged view of area VIII in FIG. 6.
Figures 9, 10:
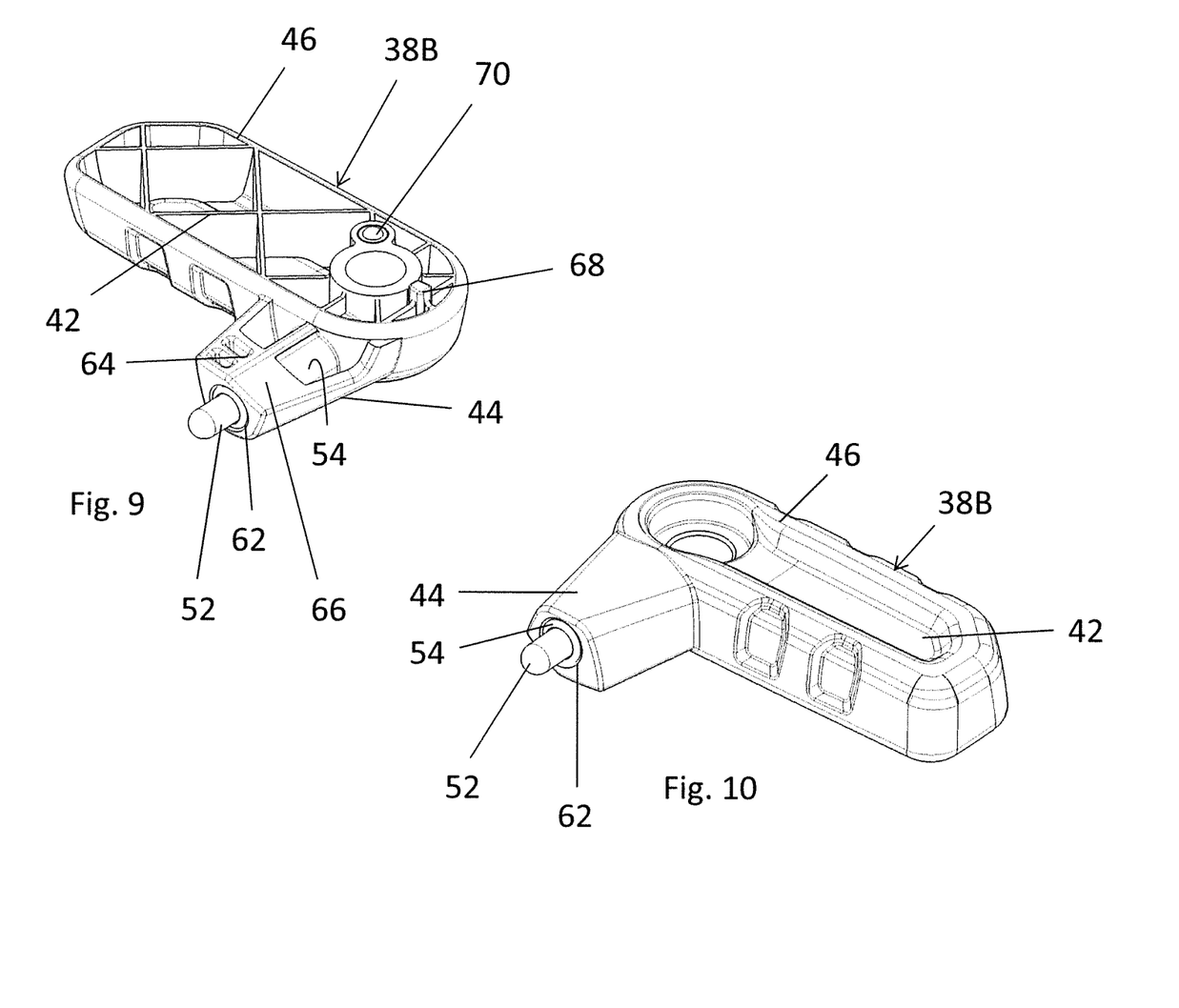
FIG. 9 shows a first perspective view of a securing handle of the securing mechanism in an isolated illustration.
FIG. 10 shows a second perspective view of the securing handle.
Figures 11, 12:
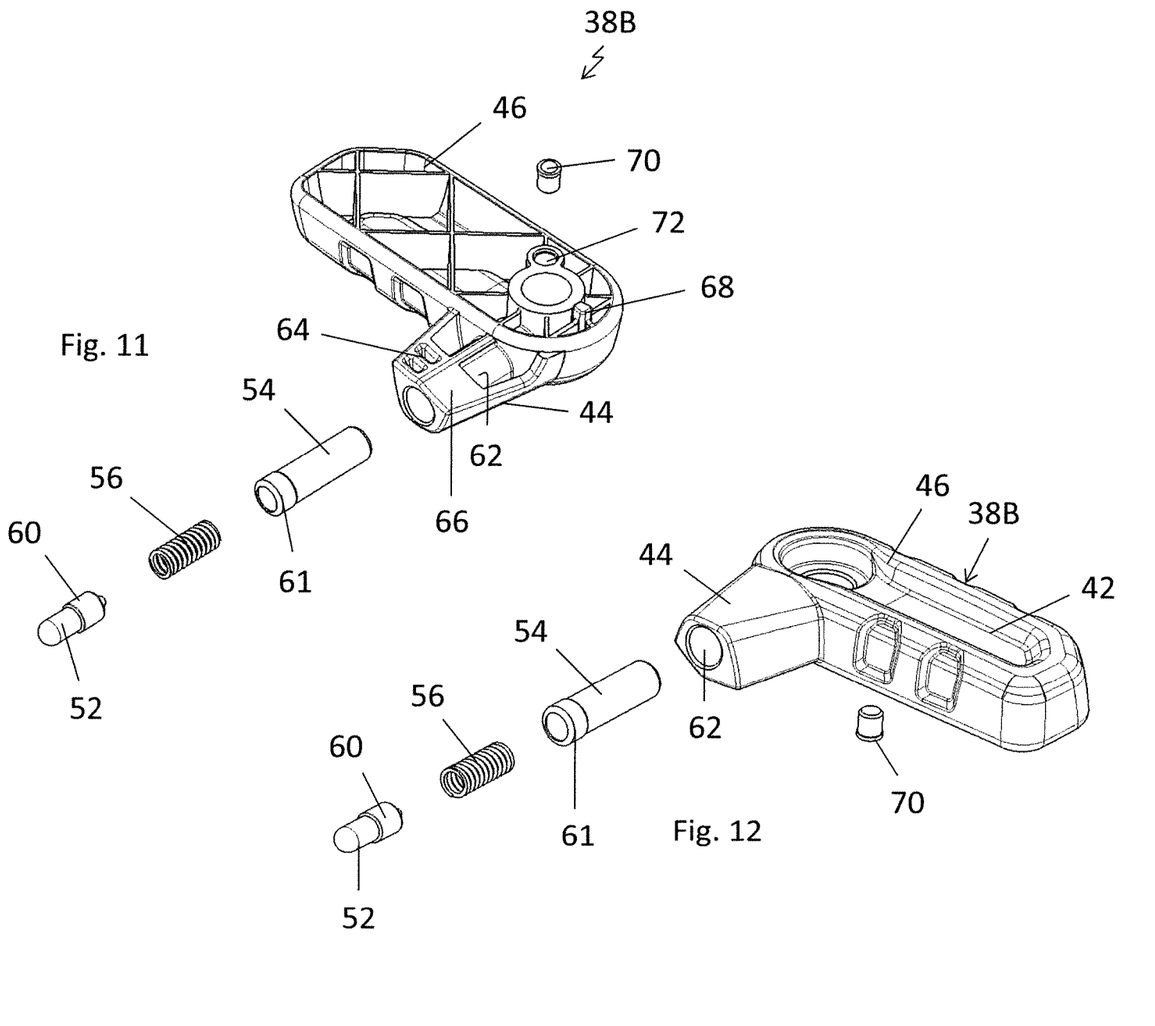
FIG. 11 shows a view of the securing handle corresponding to FIG. 8, but in an exploded illustration.
FIG. 12 shows a perspective view of the securing handle corresponding to FIG. 10, but in an exploded illustration.
Figure 13:
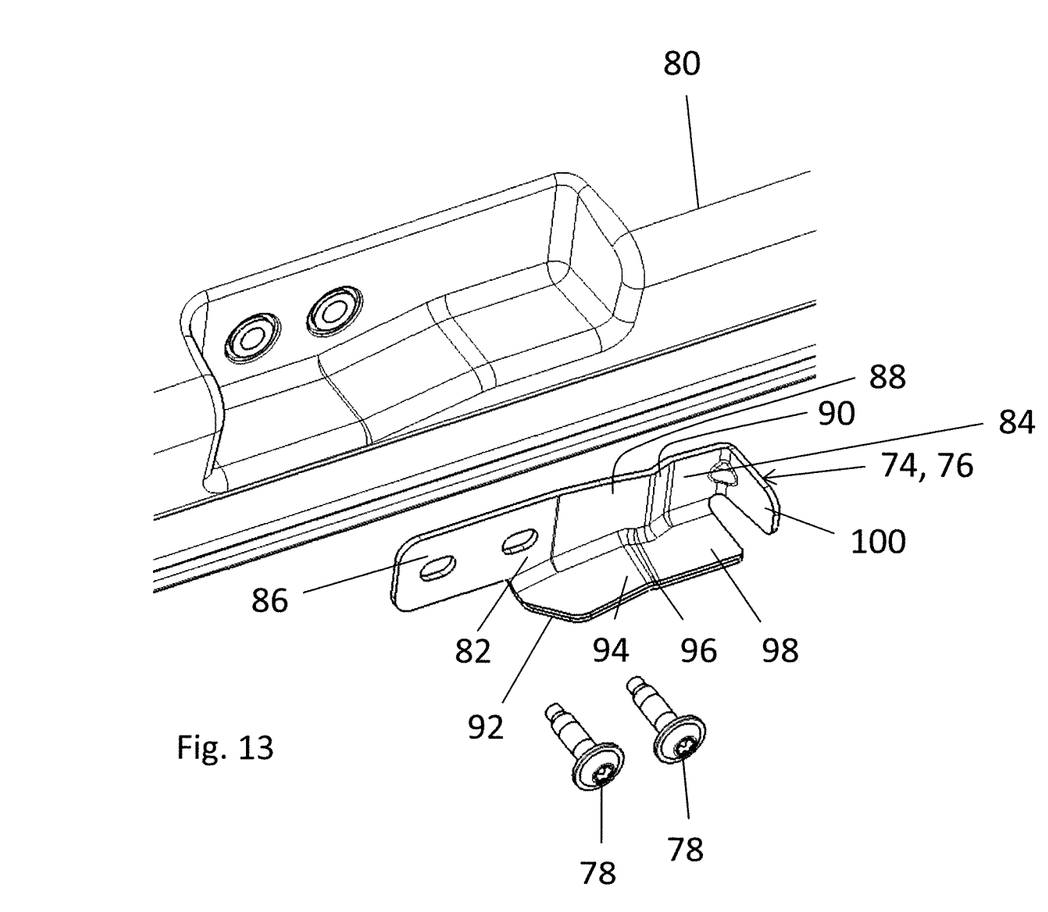
FIG. 13 shows a latch counterpart of the securing device together with a roof side rail in a state prior to installation.

The drawing shows a passenger vehicle 10 which is an all-terrain vehicle and has a vehicle body 12 comprising a cabin 14 which encompasses a passenger compartment and a luggage compartment and is limited at the top by a vehicle roof 16. The vehicle body 12 comprises four pillars 18, 20, 22 and 24 on either side of a vertical longitudinal center plane of the vehicle, which connect a beltline to the vehicle roof 16. Pillar 18 forms what is referred to as an A-pillar, which limits a windshield of the passenger vehicle 10 at the sides. Pillar 20 forms a front center pillar or B-pillar. Pillar 22 forms a rear center pillar or C-pillar, and pillar 24 forms a rear pillar or D-pillar, which limits a back door or rear lid of the vehicle body at the sides. A side window 26 is disposed between pillars 22 and 24, which forms what is referred to as a quarter window and which covers a lateral opening 28 of the cabin 14 when in a closed position and is separated from the vehicle body 12 when in an open position.

The quarter windows disposed on both sides will be explained below with reference to only the quarter window disposed on the left with respect to the forward direction of travel of the passenger vehicle 10. The quarter window disposed on the right with respect to the forward direction of travel is analogous thereto, which is why it is not described in detail for the sake of clarity.

The quarter windows 26 each comprise a window pane 30 which is transparent and limited by a frame 32. At its bottom, the frame 32 has a profile 34 which is engaged with a vehicle-mounted strip 36 when in the closed position.

To secure the quarter window 26 in its closed position, two securing devices 38 are provided which are disposed on the upper leg of the frame 32, said leg extending in the longitudinal direction of the vehicle.

The two securing devices 38A and 38B, which comprise securing handles 40A and 40B, respectively, each having an L-shaped outline, are mirror-symmetric to each other, which is why, for the sake of clarity, the two securing devices 38A and 38B will be explained below with reference to only the forward or front-side securing handle 40B, which is illustrated in FIGS. 4 to 13.

The securing handle 40B comprises a main body 46, which is formed by a plastic injection-molded part. The main body 46 is pivotably mounted on the frame 32 of the quarter window 26 via a bearing bolt 48 made of steel. To this end, the bearing bolt 48 engages into a thread 50 formed on the frame 32.

The securing handle 40B has an operating arm 42 and a latch arm 44 oriented at a right angle thereto. The latch arm 44 of the securing handle 40B comprises a latch element which is formed by a pin 52 having a semispherical front end, the pin 52 consisting of steel and being mounted to shift in a steel sleeve 54. The pin 52 is supported by a coil spring 56 made of steel and resting on a support 58 of the steel sleeve 54 at the side facing away from the pin 52. Moreover, the plunger-like pin 52 has an annular collar 60 which serves as a stop defining an end position of the pin 52 and interacting with a crimping zone 61 of the steel sleeve 54 on one side and serving as a support surface for the coil spring 56 on the other side. The unit formed by the steel pin 52, the steel sleeve 54 and the coil spring 56 is press-fitted into a recess 62 of the latch arm 44 of the securing handle 40B and thus held in the securing handle 40B.

The latch arm 44 of the securing handle 40B has a contact surface 64 which is provided with a ramp portion 66.

Furthermore, the operating arm 42 of the securing handle 40B has a stop 68 on its inside, the stop 68 defining at least an end position of the securing handle 40B, and a spring-loaded indexing ball 70 disposed in a housing. The housing is accommodated in a hole 72 in the main body 46 of the securing handle 40B.

The securing device 38B additionally comprises a latch counterpart 74 which forms a sliding plate 76 and which is fixed in a recess of a side rail 80 of the vehicle roof 16 via two mounting screws 78 disposed in a fastening section 86. The sliding plate 76 has a slide portion 82 on which a latch seat 84 is formed, within which the pin 52, which forms a latch element, is disposed when the securing handle SOB is in the locked position (cf. FIGS. 4 and 8, for example). Between the fastening section 86, in which the two mounting screws 78 are disposed, ad the latch seat 84, the slide portion 82 has two ramp section 88 and 90 which are inclined in opposite directions. When the securing handle 40B is being pivoted from the unlocked position into the locked position, the pin 52 first slides across ramp section 88, which constitutes a locking ramp, and when the securing handle 40B is being displaces from the locked position into the unlocked position, the pin 52 first slides across a ramp section 90, which constitutes an unlocking ramp, the pin 52 being pushed into the steel sleeve 54 against the force of the coil spring 56 in each case.

Furthermore, the sliding plate 76 has a side wall 92 having two ramp sections 94 and 96 which are inclined in opposite directions and on which the contact surface 64 slides with its ramp section 66 when the securing handle 40B is being displaced or pivoted. When in the locked position, the contact surface 64 is in contact with a locking section 98 of the side wall 92, the locking section 98 forming a seat.

Furthermore, the sliding plate 76 comprises a stopper tab 100 which limits the angle of rotation of the securing handle 40B when the latter is being displaced into the locked position.

We claim:

1. A motor vehicle comprising
   an openable side window which covers a lateral vehicle opening when in its closed position and can be locked by means of a securing device,
   the securing device comprising a pivotable securing handle which can be pivoted between an unlocked position and a locked position and has an operating arm and a latch arm which, when in the locked position, interacts with a latch counterpart,
   wherein the latch arm comprises a functional element which is pre-loaded radially outward with respect to a pivot axis of the securing handle,
   wherein the latch counterpart comprises a sliding plate having a slide portion on which the functional element of the latch arm slides when the securing handle is being pivoted into the locked position, and
   wherein the sliding plate has a side wall on which a lateral contact surface of the latch arm of the securing handle slides when the securing handle is being pivoted into the locked position.

2. The motor vehicle according to claim 1, wherein the functional element is a pin that is mounted to shift.

3. The motor vehicle according to claim 2, wherein the pin is mounted in a housing or sleeve which is accommodated in a body of the latch arm of the securing handle.

4. The motor vehicle according to claim 3, wherein the housing or sleeve is press-fitted into a recess in the latch arm.

5. The motor vehicle according to claim 3, wherein the pin has an annular collar which serves as a stop which defines at least one end position of the pin.

6. The motor vehicle according to claim 1, wherein the functional element is pre-loaded by means of a spring device.

7. The motor vehicle according to claim 6, wherein the spring device comprises a compression coil spring.

8. The motor vehicle according to claim 1, wherein the slide portion forms a latch seat in which the functional element is disposed when in the locked position.

9. The motor vehicle according to claim 8, wherein the slide portion has two ramp sections which are inclined in opposite directions and which transition into each other and one of which limits the latch seat.

10. The motor vehicle according to claim 1, wherein the side wall has a seat section in which the contact surface of the latch arm of the securing handle is disposed when in the locked position.

11. The motor vehicle according to claim 10, wherein the seat section is limited by a ramp.

12. The motor vehicle according to claim 1, wherein the contact surface of the latch arm of the securing handle has a ramp portion.

13. The motor vehicle according to claim 1, wherein the securing handle has at least one stop or stopper boss which defines the locked position and/or the unlocked position of the securing handle.

14. The motor vehicle according to claim 1, wherein the securing handle comprises an indexing element which engages into an indexing recess when in the locked position and/or in the unlocked position.

15. The motor vehicle according to claim 14, wherein the indexing element is formed by a ball.

16. The motor vehicle according to claim 1, wherein the securing handle is pivotably mounted on a frame of the side window and the latch counterpart is attached to the vehicle.

17. The motor vehicle according to claim 1, wherein the latch counterpart is disposed on a roof side rail of a vehicle body.

18. A motor vehicle comprising an openable side window which covers a lateral vehicle opening when in its closed position and can be locked by means of a securing device, the securing device comprising a pivotable securing handle which can be pivoted between an unlocked position and a locked position and has an operating arm and a latch arm which, when in the locked position, interacts with a latch counterpart, wherein the latch arm comprises a functional element which is pre-loaded radially outward with respect to a pivot axis of the securing handle;
   wherein the latch counterpart comprises a sliding plate having a slide portion on which the functional element of the latch arm slides when the securing handle is being pivoted into the locked position;
   wherein the slide portion forms a latch seat in which the functional element is disposed when in the locked position;
   wherein the slide portion has two ramp sections which are inclined in opposite directions and which transition into each other and one of which limits the latch seat;
   wherein the sliding plate has a side wall on which a lateral contact surface of the latch arm of the securing handle slides when the securing handle is being pivoted into the locked position.

19. The motor vehicle according to claim 18, wherein the side wall has a seat section in which the contact surface of the latch arm of the securing handle is disposed when in the locked position.

20. The motor vehicle according to claim 19, wherein the seat section is limited by a ramp.

* * * * *